United States Patent [19]

Sasaki

[11] Patent Number: 4,507,617

[45] Date of Patent: Mar. 26, 1985

[54] CARRIER RECOVERY CIRCUIT FOR A PSK MODULATED SIGNAL

[75] Inventor: Susumu Sasaki, Fujisawa, Japan

[73] Assignee: Fujitsu Limited, Kawasaki, Japan

[21] Appl. No.: 406,940

[22] Filed: Aug. 10, 1982

[30] Foreign Application Priority Data

Aug. 10, 1981 [JP] Japan .................... 56-124872

[51] Int. Cl.³ .................. H04L 27/22; H04L 7/02; H03L 7/08; H03D 3/18
[52] U.S. Cl. .................... 329/50; 329/123; 329/124; 331/12; 331/17; 331/23; 375/52; 375/83; 375/120
[58] Field of Search ........... 329/50, 122, 123, 124, 329/126; 331/4, 12, 17, 23, DIG. 2; 375/53, 54, 85, 86, 110, 120, 52, 83

[56] References Cited

U.S. PATENT DOCUMENTS

| 3,568,067 | 3/1971 | Williford | 329/124 X |
| 3,748,590 | 7/1973 | Gray | 329/124 X |
| 4,027,274 | 5/1977 | Fukui et al. | 331/17 X |
| 4,100,503 | 7/1978 | Lindsey et al. | 331/12 X |
| 4,107,623 | 8/1978 | Graf et al. | 331/17 X |
| 4,180,779 | 12/1979 | Hook et al. | 329/50 |
| 4,388,596 | 6/1983 | Yamashita | 331/17 X |
| 4,394,626 | 7/1983 | Kurihara et al. | 375/120 X |
| 4,419,759 | 12/1983 | Poklemba | 375/120 X |

FOREIGN PATENT DOCUMENTS 0149554 11/1980 Japan ................... 375/52

OTHER PUBLICATIONS (Japanese Language Pub., Author not known), "One Consideration of an AFC Circuit in a Costas Type Carrier Recovery Circuit", Electronic Communication Society, Communication Division.

Primary Examiner—Eugene R. LaRoche
Assistant Examiner—W. R. Paxman
Attorney, Agent, or Firm—Staas & Halsey

[57] ABSTRACT

A carrier recovery circuit for use in a demodulator for a $2^n$-phase PSK modulated signal which comprises a phase-locked loop including a voltage-controlled oscillator (7) and an automatic frequency control (AFC) loop for avoiding the false lock phenomenon. The AFC loop is comprised of two differentiating circuits (21, 25), two mixer circuits (22, 26), and a difference circuit (27), and forms a symmetrical structure so as to exclude undesired noise, thereby carrying out a stable AFC operation.

6 Claims, 16 Drawing Figures

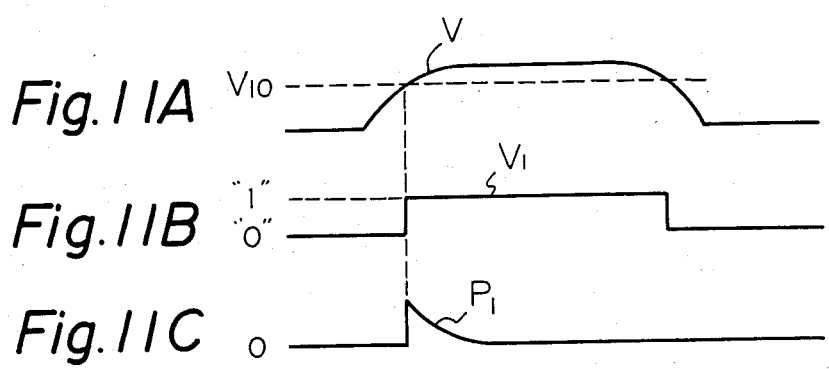
Fig. 11A
Fig. 11B
Fig. 11C
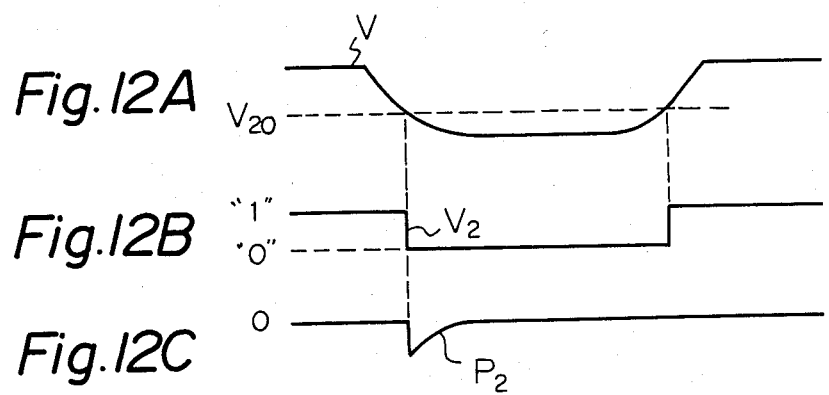
Fig. 12A
Fig. 12B
Fig. 12C

CARRIER RECOVERY CIRCUIT FOR A PSK MODULATED SIGNAL

BACKGROUND OF THE INVENTION (1) Field of the Invention

The present invention relates to a carrier recovery circuit for use in a demodulator for a $2^n$-phase ($n=1, 2, \ldots$) phase-shift keying (PSK) modulated signal.

(2) Description of the Prior Art

In general, a carrier-recovery circuit is provided in a demodulator of a receiver for $2^n$-phase PSK modulated signals. Such a carrier recovery circuit is already known. For example, in a carrier recovery circuit, according to the IF (Intermediate Frequency) multiplying system, four-phase PSK modulated signals are multiplied by four so as to obtain non-modulated signals, and after that, the non-modulated signals are divided by four so as to recover the carrier in phase synchronization with the received PSK signals. In a carrier recovery circuit according to the demodulation system, the received PSK modulated signals are again modulated by using demodulated output signals. In a carrier recovery circuit according to the baseband processing system, the Costas loop is used.

In the baseband processing system, since carrier-waves are recovered directly from the received PSK modulated signals, a phase-locked loop (PLL) circuit is provided. This PLL circuit is preferably locked in the frequency of the carrier waves; however, this PLL circuit may also be locked in the false-lock frequencies:

$$f_0 \pm f_c/N, f_0 \pm 2f_c/N, \ldots$$

where $f_0$ is the frequency of the carrier waves, $f_c$ is a clock frequency, and $N=2^n$. In particular, such a false lock phenomenon often occurs in the case of a low capacity digital communication system where the ratio of the clock frequency ($f_c$) to the carrier wave frequency ($f_0$) is small.

In order to avoid the above-mentioned false lock phenomenon, it has been known to use a highly stable voltage-controlled crystal oscillator in the PLL circuit. However, the use of such a crystal oscillator in a carrier recovery circuit is costly, and, in addition, the normal lock-in range for the carrier wave frequency is small.

In order to enlarge the normal lock-in range for the PSK modulated signals, it has also been known to add a highly stable crystal oscillator and a sweep circuit to the PLL circuit. In a carrier recovery circuit using a highly stable crystal oscillator and a sweep circuit, the false lock phenomenon is detected by obtaining the frequency difference between the voltage-controlled oscillator of the PLL circuit and the highly stable crystal oscillator. That is, when the frequency difference is larger than a predetermined value, the sweep circuit sweeps the control voltage of the voltage-controlled oscillator so that the PLL circuit is freed from the false lock state and again performs the lock-in operation for the carrier waves. However, even when the PLL circuit is freed from one false lock state, the PLL circuit may be again locked in another false lock state. Therefore, in order to enlarge the lock-in range for the PSK modulated signals, the design of the sweep circuit, including the sweep frequency, and the sweep amplitude must be carefully determined.

In order to enlarge the normal lock-in range for the PSK modulated signal frequency, it has been further known to add a simple automatic frequency control (AFC) circuit to the PLL circuit. In a carrier recovery circuit using an AFC circuit, the sine-wave signals or the cosine-wave signals obtained in the PLL circuit are differentiated and, the differentiated signals are supplied to the cosine-wave signals or sine-wave signals to obtain the frequency difference between the received PSK modulated signal and the output signal of the voltage-controlled oscillator. This frequency difference serves as a control voltage for the voltage-controlled oscillator. Therefore, even if the PLL circuit is locked in a false lock state, the PLL circuit is freed from the false lock state by AFC. Thus, enlargement of the normal lock-in range for the carrier waves is economically realized. However, in this recovery circuit, spurious signals are generated due to the asymmetry of the AFC circuit, thereby causing the normal lock-in operation to be unstable.

SUMMARY OF THE INVENTION

It is a principal object of the present invention to provide a carrier recovery circuit using an AFC circuit enabling the normal lock-in operation to be stable.

According to the present invention, there is provided a carrier recovery circuit for use in a demodulator for a $2^n$-phase ($n=1, 2, \ldots$) PSK modulated signal comprising: voltage-controlled oscillator means for generating first and second signals in phase quadrature; first and second mixing means for mixing the PSK modulated signal with the first and second signals, respectively; baseband processing means for multiplying the output signals of the first and second mixing means by a factor of $2^n$ to generate third and fourth signals in phase quadrature; first and second differentiating means for differentiating the third and fourth signals; third mixing means for mixing the output signal of the first differentiating means with the fourth signal; fourth mixing means for mixing the output signal of the second differentiating means with the third signal; means for generating the difference between the output signals of the third and fourth mixing means; first control means for supplying a first control voltage indicative of the third or fourth signal to the voltage-controlled oscillator means; and second control means for supplying a second control voltage indicative of the output signal of the difference-generating means to the voltage-controlled oscillator means.

BRIEF DESCRIPTION OF THE DRAWINGS

The present invention will be more clearly understood from the description as set forth below, contrasting the present invention with the prior art and referring to the accompanying drawings, wherein:

FIGS. 11A, 11B, 11C, 12A, 12B, and 12C are timing diagrams of the signals appearing in the circuit of FIG. 10.

DESCRIPTION OF THE PREFERRED EMBODIMENT

Figure 1:
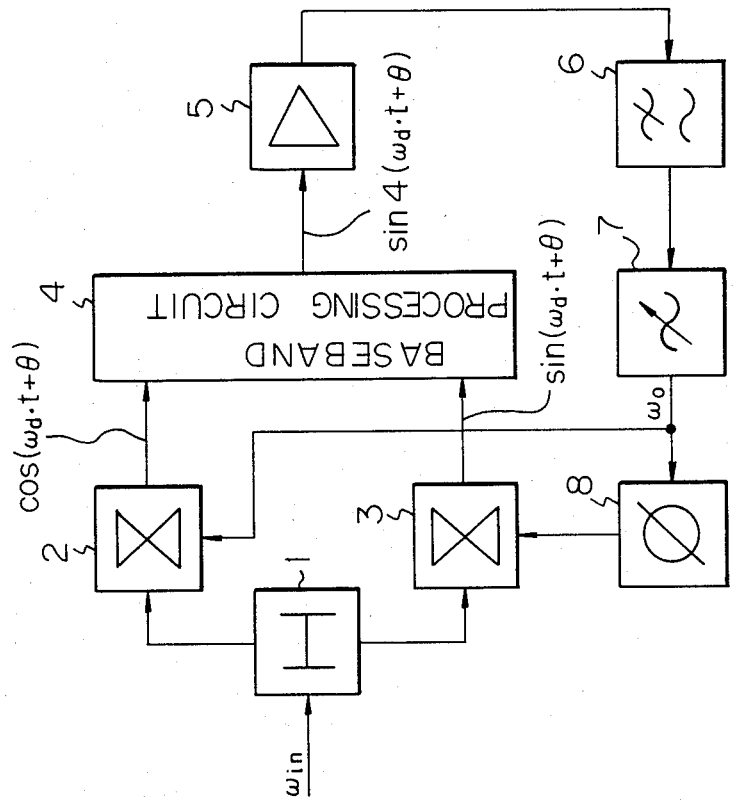
FIG. 1 is a block circuit diagram of a first prior art carrier recovery circuit.

In FIG. 1, which illustrates a first prior art circuit, a PLL circuit is constructed of a hybrid circuit 1, phase detectors or mixer circuits 2 and 3, a Costas loop-type baseband processing circuit 4, an amplifier 5, a low pass filter 6, a voltage-controlled oscillator 7, and a 90° phase shifter 8. A received four-phase PSK modulated input signal having frequency $\omega_{in}$ passes through the hybrid circuit 1 to mixer circuits 2 and 3 which generate output signals cos $(\omega_d \cdot t + \theta)$ and sin $(\omega_d \cdot t + \theta)$ in phase quadrature where $\omega_d$ and $\theta$ are differences in frequency and phase, respectively, between the input signal $\omega_{in}$ and the output signal $\omega_0$ of the voltage-controlled oscillator 7. Baseband processing circuit 4 generates output sin $4(\omega_d \cdot t + \theta)$. Thus, voltage-controlled oscillator 7 is controlled by voltage sin $4(\omega_d \cdot t + \theta)$ so as to generate carrier waves. If the PLL circuit is locked in on the carrier waves, $\omega_d = 0$ and $\theta = 0$, that is, sin $4(\omega_d \cdot t + \theta) = 0$. However, when enlarging the lock-in range for the carrier waves, a false lock phenomenon often occurs. In this case, sin $4(\omega_d \cdot t + \theta) = 0$ but $\omega_d \neq 0$. In order to avoid this false lock phenomenon, it has been proposed to use a highly stable crystal oscillator as the voltage-controlled oscillator 7. Such use, however, makes the circuit costly and the normal lock-in range small.

Figure 2:
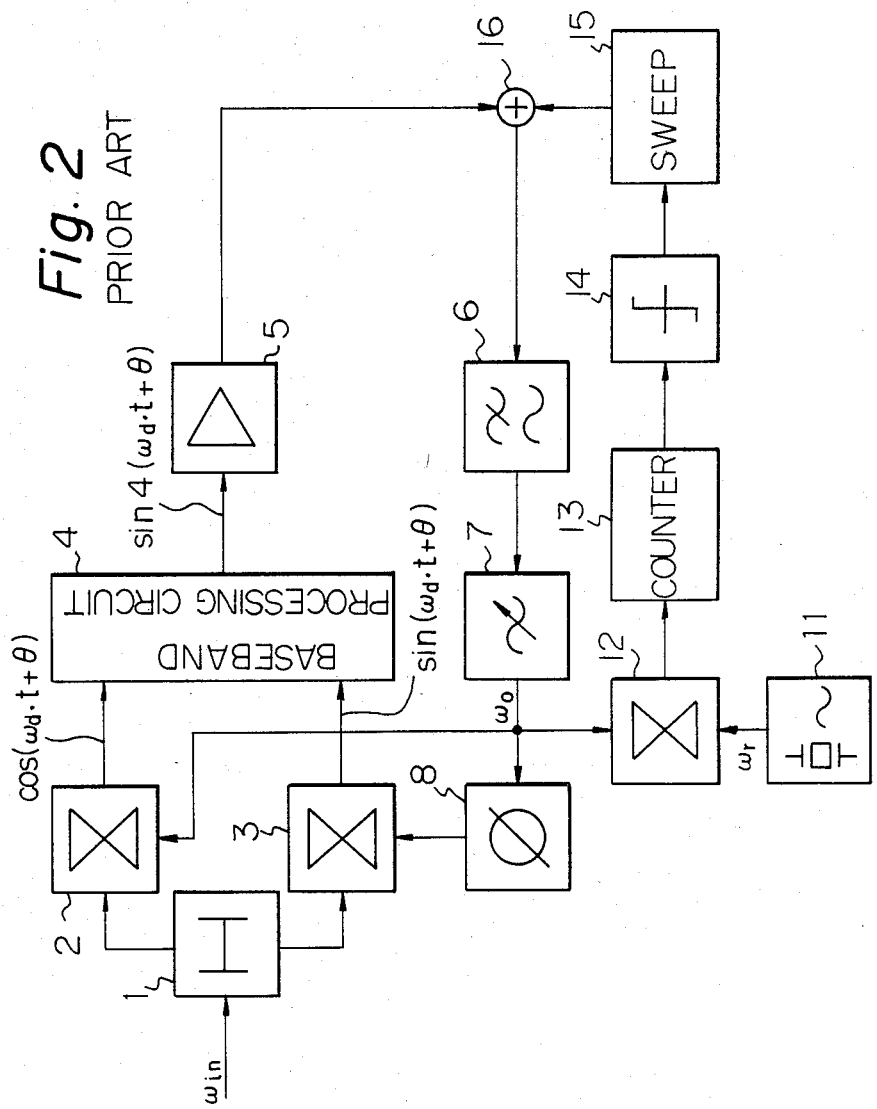
FIG. 2 is a block circuit diagram of a second prior art carrier recovery circuit.

In FIG. 2, which is a second prior art circuit, elements 11 through 16 are added to the elements of FIG. 1. Reference numeral 11 designates a highly stable crystal oscillator having frequency $\omega_r$, 12 a mixer circuit, 13 a counter, 14 a determination circuit, 15 a sweep circuit, and 16 a sum circuit. The difference in frequency between voltage-controlled oscillator 7 and crystal oscillator 11 is counted by counter 13. When the frequency difference is larger than a predetermined value, determination circuit 14 intiates the operation of sweep circuit 15 so that the sweep voltage is added to the control voltage of the voltage-controlled oscillator 7, thereby sweeping the oscillating frequency thereof. As a result, the PLL circuit is freed from the false lock state and again performs the normal lock-in operation on the carrier waves. In the circuit of FIG. 2, however, even if the PLL circuit is freed from one false lock state, the circuit may also be locked in another false lock state. Therefore, in order to enlarge the normal lock-in range for the carrier waves, the sweep frequency, the sweep amplitude, and the like must be carefully designed. As a result, it is not easy to manufacture and adjust the circuit of FIG. 2.

Figure 3:
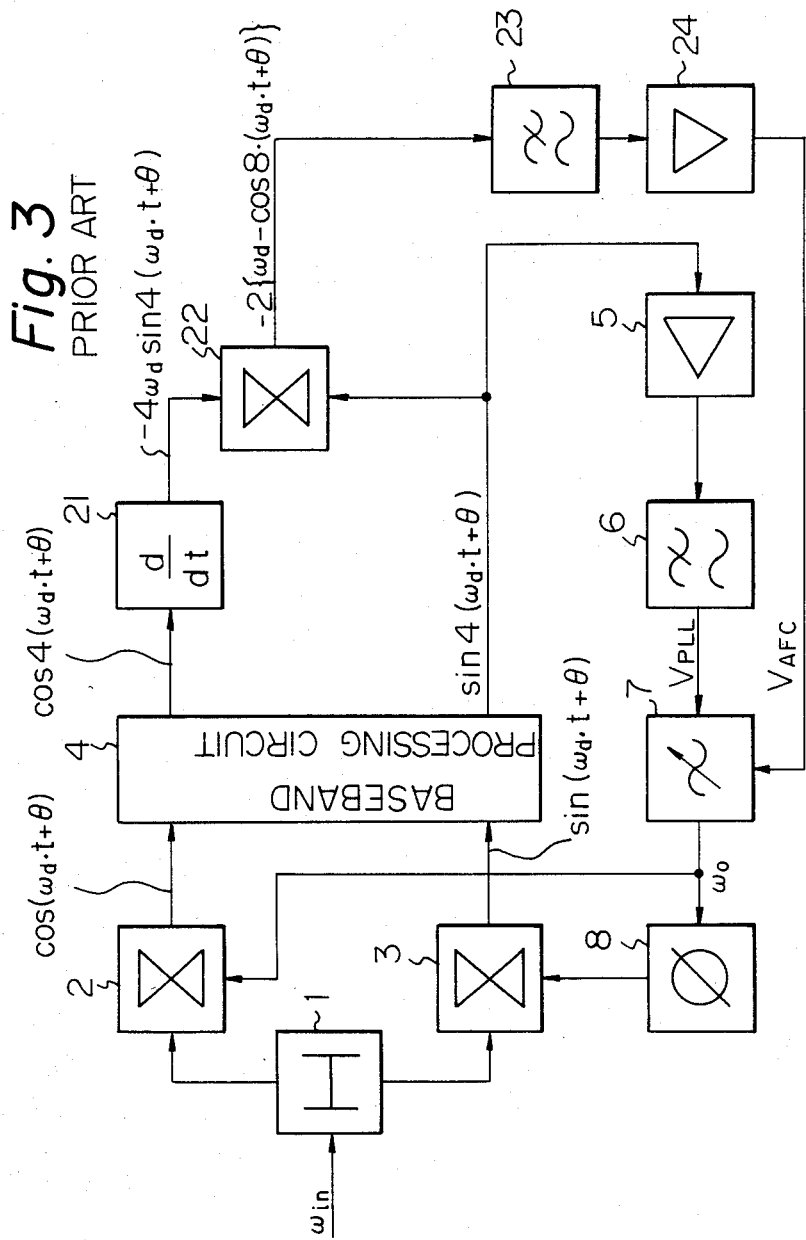
FIG. 3 is a block circuit diagram of a third prior art carrier recovery circuit.

In FIG. 3 which is a third prior art circuit, elements 21 through 24 are provided to form an AFC loop. Reference numeral 21 designates a differentiating circuit, 22 a mixer circuit, 23 a low pass filter, and 24 an amplifier. Differentiating circuit 21 generates the output $$\frac{d}{dt} \cos 4(\omega_d \cdot t + \theta) = -4\omega_d \sin 4(\omega_d \cdot t + \theta)$$

Therefore, mixer circuit 22 generates the output $$-4\omega_d \sin^2 (\omega_d \cdot t + \theta) = -2\{\omega_d - \cos 8(\omega_d \cdot t + \theta)\}$$

That is, a frequency difference of $-2\omega_d$ is supplied through the low pass filter 23 and the amplifier 24 to the voltage-controlled oscillator 7 to perform AFC. Thus, voltage-controlled oscillator 7 is controlled by first control voltage $V_{PLL}$ due to the phase-locked loop and by second control voltage $V_{AFC}$ due to the AFC loop. As a result, even if the PLL circuit becomes locked in a false lock state, the PLL circuit is freed from the false lock state by the AFC loop and is moved toward the center of the normal lock-in range for the carrier waves.

In the circuit of FIG. 3, however, there is a serious problem in that the AFC is unstable due to the AFC circuit being asymmetrical, with the result that control voltage $V_{AFC}$ is relatively noisy in spite of the presence of low pass filter 23, which eliminates the high frequency component of a signal passing therethrough. Note that usually differentiating circuit 21 creates a large amount of noise.

Figure 4:
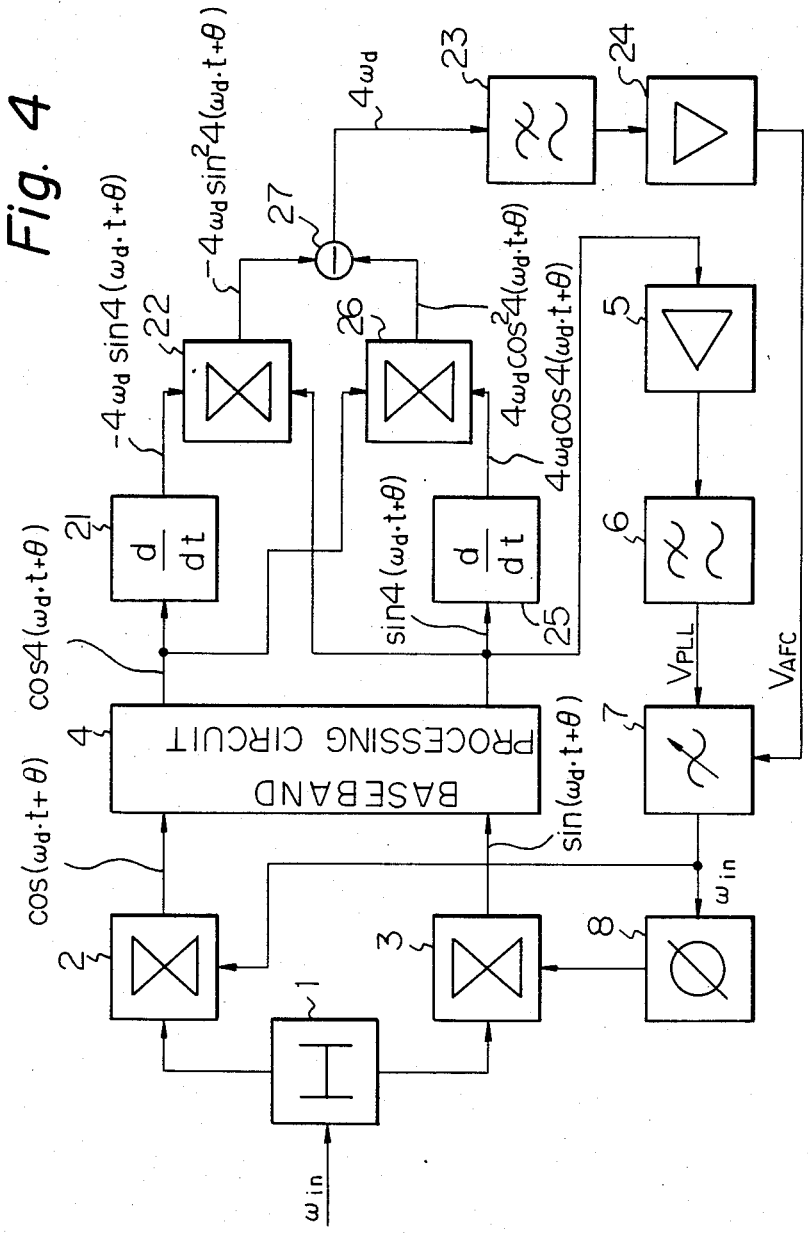
FIG. 4 is a block circuit diagram of one embodiment of the carrier recovery circuit according to the present invention.

In FIG. 4 which is one embodiment of the present invention, a symmetrical AFC circuit is provided so that a stable AFC operation is performed. That is, a differentiating circuit 25, a mixer circuit 26, and a difference circuit 27 are added to the elements of FIG. 3.

As explained above, mixer circuits 2 and 3 generate outputs, cos $(\omega_d \cdot t + \theta)$ and sin $(\omega_d \cdot t + \theta)$, in phase quadrature supplied to the baseband processing circuit 4, which, in turn, generates two outputs cos $4(\omega_d \cdot t + \theta)$ and sin $4(\omega_d \cdot t + \theta)$ also in phase quadrature. Sine-wave component sin $4(\omega_d \cdot t + \theta)$ is supplied to the PLL while both the cosine-wave and sine-wave components are supplied to the AFC loop.

Differentiating circuits 21 and 25 differentiate outputs cos $4(\omega_d \cdot t + \theta)$ and sin $4(\omega_d \cdot t + \theta)$, respectively, of the baseband processing circuit 4 and generate the following differentiating outputs:

$$\frac{d}{dt} \{\cos 4(\omega_d \cdot t + \theta)\} = -4\omega_d \sin 4(\omega \cdot t + \theta)$$

$$\frac{d}{dt} \{\sin 4(\omega_d \cdot t + \theta)\} = 4\omega_d \cos 4(\omega_d \cdot t + \theta)$$

Mixer circuit 2 mixes the output of the differentiating circuit 21 with the second output of the baseband processing circuit 4, while mixer circuit 26 mixes the output of the differentiating circuit 25 with the first output of the baseband processing circuit 4. Therefore, the outputs of the mixer circuits 22 and 26 are as follows:

$$-4\omega_d \sin^2 4(\omega_d \cdot t + \theta)$$

and $$4\omega_d \cos^2 4(\omega_d \cdot t + \theta)$$

Difference circuit 27 generates the difference between the outputs of mixer circuits 22 and 26, that is, $4\omega_d$. The output of difference circuit 27 is supplied through low pass filter 23 and amplifier 24 to the voltage-controlled oscillator 7 as control voltage $V_{AFC}$. Therefore, when frequency difference $\omega_d$ between the received PSK input signal and the output of voltage-controlled oscillator 7 locked in a false lock state is detected, voltage-controlled oscillator 7 is controlled so that the frequency difference $\omega_d$ becomes zero. Thus, an AFC loop is produced so as to avoid the false lock phenomenon.

In addition, output $\sin 4(\omega_d \cdot t + \theta)$ of baseband processing circuit 4 is supplied through amplifier 5 and low pass filter 6 to voltage-controlled oscillator 7 as the control voltage $V_{PLL}$. If the frequency difference $\omega_d$ equals zero, control voltage $V_{PLL}$ has a value corresponding to the difference in phase between the received PSK modulated input signal and the output of voltage-controlled oscillator 7 so that a PLL is produced. Accordingly, carrier waves are recovered from the output of voltage-controlled oscillator 7 in synchronization with the phase of the received input signals.

It should be noted that, in a PLL, if the frequency difference, $\omega_d$ is not zero, $V_{PLL}$ is not zero either. Therefore, the PLL also serves as another AFC loop.

In FIG. 4, even when the outputs of the differentiating circuits 21 and 25 include undesired noise, such undesired noise is excluded by the difference circuit 27. In addition, the high frequency component of the output of the difference circuit 27 is excluded by the low pass filter 23. Thus, control voltage $V_{AFC}$ of FIG. 4 is more stable than control voltage $V_{AFC}$ of FIG. 3.

Figure 5:
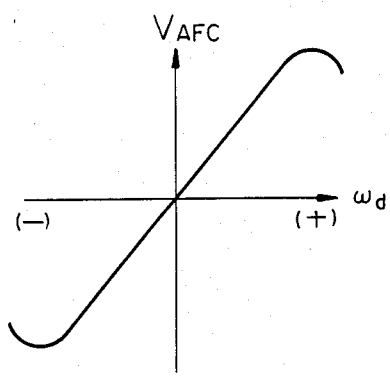
FIG. 5 is a graph of the relationship between frequency difference $\omega_d$ and control voltage $V_{AFC}$ for the circuit of FIG. 4.

FIG. 5 is a graph of the relationship between the frequency difference $\omega_d$ and the control voltage $V_{AFC}$ of voltage-controlled oscillator 7 of FIG. 4. As mentioned above, control voltage $V_{AFC}$, given by the output of difference circuit 27, controls the voltage-controlled oscillator 7 so that the frequency difference $\omega_d$ becomes zero.

Figure 6:
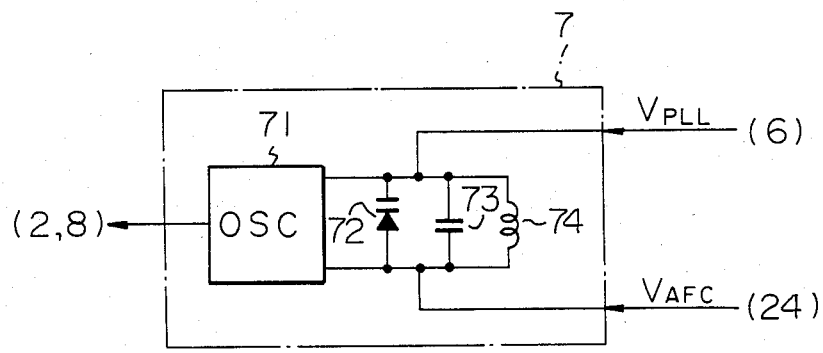
FIG. 6 is a circuit diagram of the voltage-controlled oscillator 7 of FIG. 4.

In FIG. 6, which is a circuit diagram of voltage-controlled oscillator 7 of FIG. 4, reference numeral 71 designates an oscillating circuit, 72 a variable-capacitance diode, 73 a capacitor, and 74 an inductance. The combination of variable-capacitance diode 72, capacitor 73, and inductance 74 determines the oscillating frequency of the oscillating circuit 71. In this case, the oscillating frequency varies in response to the voltage supplied to variable-capacitance diode 72, the voltage being determined by first control voltage $V_{PLL}$ and second control voltage $V_{AFC}$. First control voltage $V_{PLL}$ has a polarity responsive to the positive or negative value of the phase difference $\theta$ while second control voltage $V_{AFC}$ has a positive or negative polarity responsive to the frequency difference $\omega_d$. Two kinds of control voltages, $V_{PLL}$ and $V_{AFC}$, are superposed on the variable-capacitance diode 72 so as to lessen both the frequency difference $\omega_d$ and the phase difference $\theta$.

Figure 7:
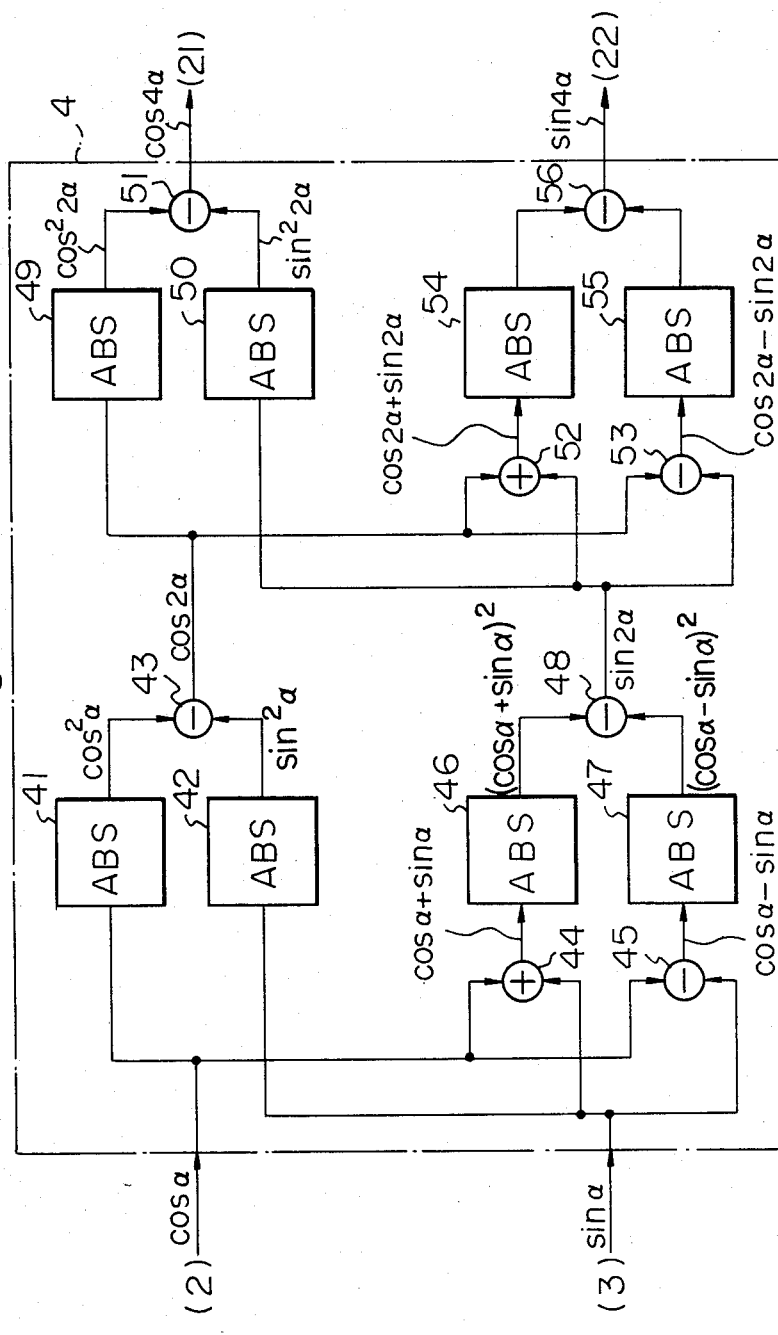
FIG. 7 is a circuit diagram of the baseband processing circuit 4 of FIG. 4.

In FIG. 7, which is a block circuit diagram of a baseband processing circuit 4 of FIG. 4, reference numerals 41, 42, 46, 47, 49, 50, 54, and 55 designate absolute value circuits, 43, 45, 48, 51, 53, and 56 designate difference circuits, and 44 and 52 designate sum circuits. It is assumed that $\alpha = \omega_d \cdot t + \theta$.

Circuits 41, 42, and 43 are used for generating the output $\cos 2\alpha$. That is, absolute value circuits 41 and 42 generate outputs $\cos^2 \alpha$ and $\sin^2 \alpha$, respectively, and difference circuit 43 generates output $\cos^2 \alpha - \sin^2 \alpha = \cos 2\alpha$.

Circuits 44 through 48 are used for generating output $\sin 2\alpha$. That is, sum circuit 44 generates output $\cos \alpha + \sin \alpha$, and, therefore, absolute value circuit 46 generates output $(\cos \alpha + \sin \alpha)^2$. In addition, difference circuit 45 generates output $\cos \alpha - \sin \alpha$, and, therefore absolute value circuit 47 generates output $(\cos \alpha - \sin \alpha)^2$. The difference circuit 48 generates the output $(\cos \alpha + \sin \alpha)^2 - (\cos \alpha - \sin \alpha)^2$
$= 4 \cos \alpha \sin \alpha$
$= 2 \sin 2\alpha$
$\cong \sin 2\alpha$ (after amplitude adjusting).

Similarly, circuits 49 through 51, which are the same as circuits 41 through 43, respectively, are used for generating output $\cos 4\alpha$, while circuits 52 through 56, which are the same as circuits 44 through 48, respectively, are used for generating output $\sin 4\alpha$.

Thus, signals $\cos \alpha$ and $\sin \alpha$ are changed to signals $\cos 4\alpha$ and $\sin 4\alpha$ by the baseband processing circuit 4 of FIG. 4.

Figure 8:
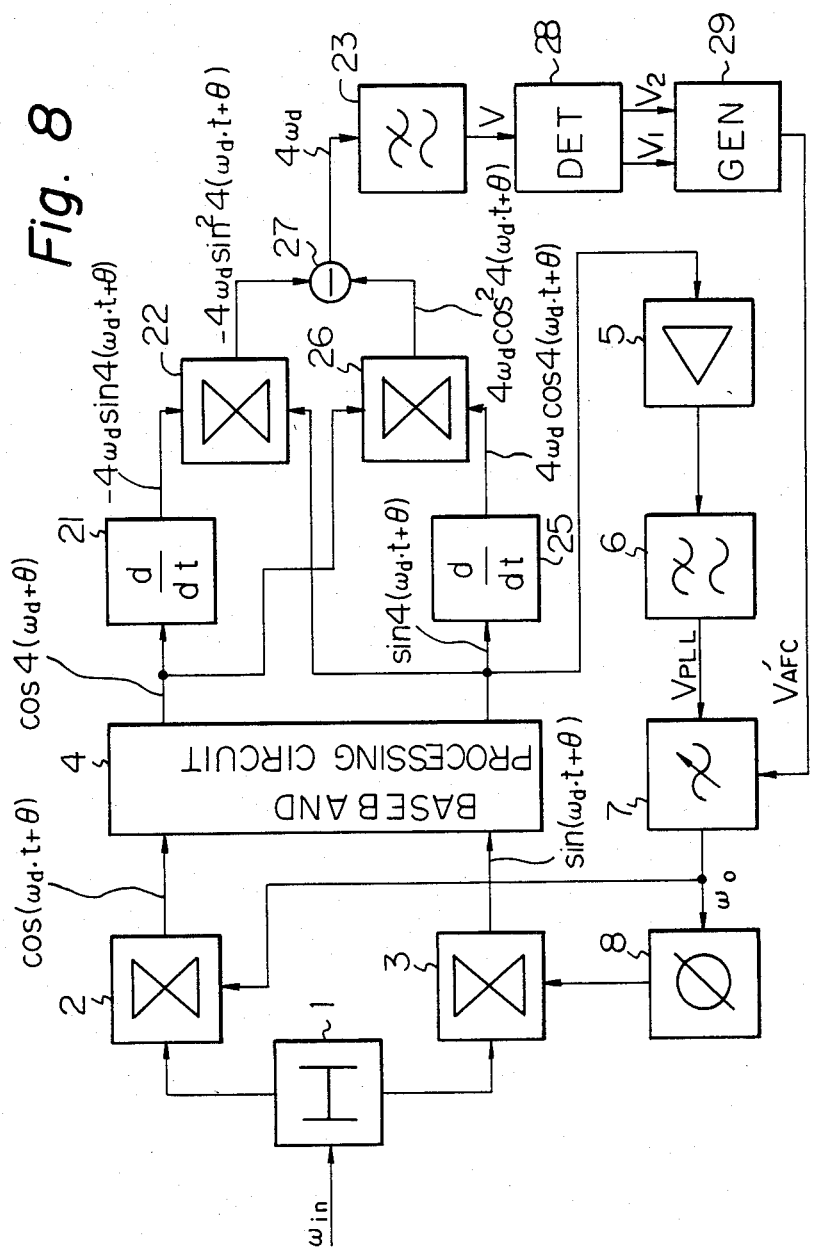
FIG. 8 is a block circuit diagram of a second embodiment of the carrier recovery circuit according to the present invention.

In FIG. 8, which is another embodiment of the present invention, determination circuit 28 and isolated-pulse generator 29 are added to the elements of FIG. 4. Determination circuit 28 determines whether output level V of the low pass filter 23 is within a predetermined range having maximum level $V_{10}$ and minimum level $V_{20}$ as shown in FIG. 9.

Figure 9:
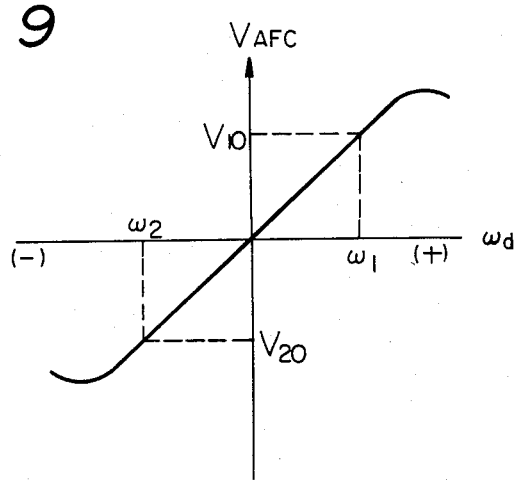
FIG. 9 is a graph for determining the threshold values $V_{10}$ and $V_{20}$ of FIG. 8.

Note that the curve in FIG. 9 is the same as the curve of FIG. 5. In FIG. 9, $\omega_1$ and $\omega_2$ are false lock frequencies, and $V_{10}$ and $V_{20}$ are output voltages of the low pass filter 23 when the frequency difference $\omega_d$ is $\omega_1$ and $\omega_2$, respectively. Such values $V_{10}$ and $V_{20}$ are threshold values of determination circuit 28 (FIG. 8).

Returning to FIG. 8, determination circuit 28 compares the output V of low pass filter 23 with the high threshold value $V_{10}$ to generate digital output $V_1$, and, simultaneously determination circuit 28 compares the output of the low pass filter 23 with the low threshold value $V_{20}$ to generate a digital output $V_2$.

When isolated-pulse generator 29 detects the rising of output $V_1$ of the determination circuit 28, generator 29 generates a positive isolated pulse. On the other hand, when isolated-pulse generator 29 detects the falling of the output $V_2$ of determination circuit 28, generator 29 generates a negative isolated pulse. Such a positive or negative isolated pulse is supplied to the voltage-controlled oscillator 7 as control voltage $V'_{AFC}$. This means that an AFC loop is produced so as to avoid the false lock phenomenon.

Figure 10:
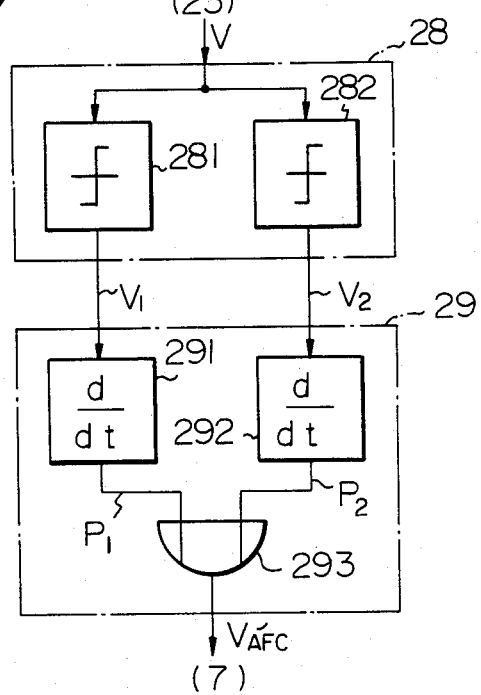
FIG. 10 is a detailed circuit diagram of the determination circuit 28 and the isolated-pulse generator 29 of FIG. 8.

In FIG. 10, which is a detailed circuit diagram of the determination circuit 28 and isolated-pulse generator 29 of FIG. 8, the determination circuit 28 comprises comparators 281 and 282 which compare output V of the low pass filter 23 with threshold values $V_{10}$ and $V_{20}$, respectively. Isolated-pulse generator 29 comprises a rising-detection circuit (differentiating circuit) 291, a falling-detection circuit (differentiating circuit) 292, and an OR circuit 293.

The waveforms of the signals in FIG. 10 are illustrated in FIGS. 11A, 11B, and 11C and FIGS. 12A, 12B, and 12C. When the output V of the low pass filter 23 becomes higher than the threshold value $V_{10}$, as illustrated in FIG. 11A, comparator circuit 281 pulls up the output $V_1$, as illustrated in FIG. 11B, so that the isolated-pulse generator 29 generates a positive isolated pulse $P_1$, as illustrated in FIG. 11C. Similarly, when the output V of the low pass filter 23 becomes lower than the threshold value $V_{20}$, as illustrated in FIG. 12A, comparator circuit 282 pulls up the output $V_2$, as illustrated in FIG. 12B, so that the isolated-pulse generator 29 generates a negative isolated pulse $P_2$, as illustrated in FIG. 12C.

Thus, in the second embodiment, when the output of the low pass filter 23, corresponding to frequency difference $\omega_d$, exceeds false lock thresholds $V_{10}$ and $V_{20}$, corresponding to frequency $\omega_1$ or $\omega_2$, a positive or negative isolated pulse is supplied to the voltage-controlled oscillator 7, thereby reducing the time period required for separating the PLL circuit from the false lock state. Note that, in this case, freedom of the PLL circuit from the false lock state always carried out by the PLL.

The above-mentioned embodiments are related to four-phase modulated waves, however, the present invention can be applied in the recovery of multi-phase modulated carrier waves such as eight-phase waves, sixteen-phase waves, and the like.

As explained hereinbefore, according to the present invention, since stable AFC is carried out for the recovery of carrier waves, a normal lock-in operation for carrier waves is carried out at a high speed. In addition, the normal lock-in range can be enlarged.

I claim:

1. A carrier-wave recovery circuit for use in a demodulator for a $2^n$-phase (n = 1, 2, ...) PSK modulated signal, comprising:

voltage-controlled oscillator means for generating first and second signals in phase quadrature;

first and second mixing means, operatively connected to said voltage-controlled oscillator means, for receiving said first and second signals, for mixing the PSK modulated signal with said first and second signals, respectively, and for generating respective first and second output signals;

baseband processing means, operatively connected to said first and second mixing means, for receiving and multiplying said first and second output signals by a factor of $2^n$ to generate third and fourth output signals respectively, in phase quadrature;

first and second differentiating means operatively connected to said baseband processing means, for receiving and differentiating said fourth and third output signals, respectively, and generating corresponding sixth and fifth output signals;

third mixing means, operatively connected to said first differentiating means, for receiving and mixing said sixth output signal with said third output signal and generating a seventh output signal;

fourth mixing means, operatively connected to said second differentiating means, for receiving and mixing said fifth output signal with said fourth output signal and generating an eighth output signal;

means, operatively connected between said third and fourth mixing means, for generating a difference signal corresponding to the difference between said seventh and eighth output signals;

first control means, operatively connected to said baseband processing means and said voltage controlled oscillator means, for receiving said fourth output signal and for supplying a first control voltage in accordance with said fourth output signal, to said voltage-controlled oscillator means; and second control means, operatively connected to said means for generating a difference signal and said voltage controlled oscillator means, for supplying a second control voltage in accordance with the value of said difference signal, to said voltage-controlled oscillator means.

2. A circuit as set forth in claim 1, wherein said voltage-controlled oscillator means comprises:

a voltage-controlled oscillator for generating said first signal; and a 90° phase shifter operatively connected to said first signal of said voltage-controlled oscillator and generating a second signal having a phase shifted from that of said first signal.

3. A circuit as set forth in claim 1, wherein said first control means comprises:

an amplifier, operatively connected to said baseband processing circuit, for receiving said fourth output signal and having an output; and a low pass filter, operatively connected to said amplifier, for receiving the output of said amplifier and for generating said first control voltage.

4. A circuit as set forth in claim 1, wherein said second control means comprises:

a low pass filter, operatively connected to said difference generating means, for receiving said difference signal; and an amplifier, operatively connected to said low pass filter, for generating said second control voltage.

5. A circuit as set forth in claim 1, wherein said second control means comprises:

a low pass filter, operatively connected to said difference generating means, for receiving said difference signal and for generating an output voltage level;

a determination circuit, operatively connected to said low pass filter, for determining whether said output voltage level of said low pass filter is within a predetermined range having an upper limit and a lower limit;

an isolated-pulse generator, operatively connected to said determination circuit, for generating an isolated pulse when said output voltage level of said low pass filter deviates from said predetermined range, said isolated pulse serving as said second control voltage.

6. A circuit as set forth in claim 5, wherein said isolated pulse has a polarity indicative of the deviation of said output voltage level above said upper limit or below said lower limit of said predetermined range.

* * * * *

UNITED STATES PATENT AND TRADEMARK OFFICE
CERTIFICATE OF CORRECTION

PATENT NO. : 4,507,617
DATED : MARCH 26, 1985
INVENTOR(S) : SUSUMU SASAKI

It is certified that error appears in the above-identified patent and that said Letters Patent is hereby corrected as shown below:

Col. 3, line 50, "intiates" should be --initiates--;
line 64, "3" should be --3,--.

Col. 4, line 46, "($\omega \cdot t + \theta$)" should be

--($\omega_d \cdot t + \theta$)-- .

line 50, "2" should be --22--.

Col. 7, line 9, after "state" insert --is--.

Signed and Sealed this

Twenty-seventh Day of August 1985

[SEAL]

*Attest:*

DONALD J. QUIGG

*Attesting Officer*  *Acting Commissioner of Patents and Trademarks*